(No Model.) 2 Sheets—Sheet 1.
R. W. HITCHINS.
MACHINERY FOR MAKING SLABS OF PLASTER, CEMENT, &c.
No. 582,060. Patented May 4, 1897.
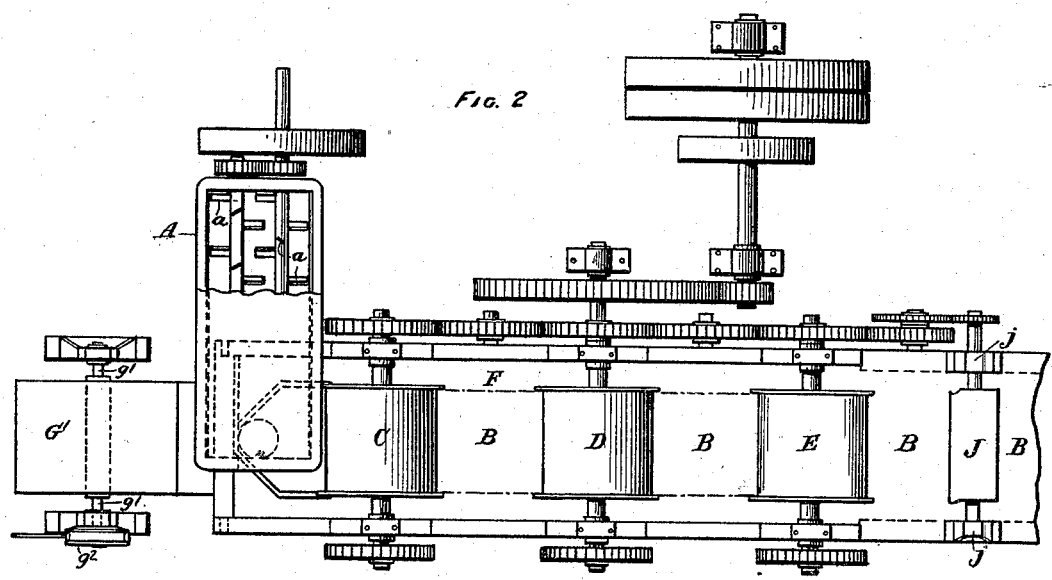
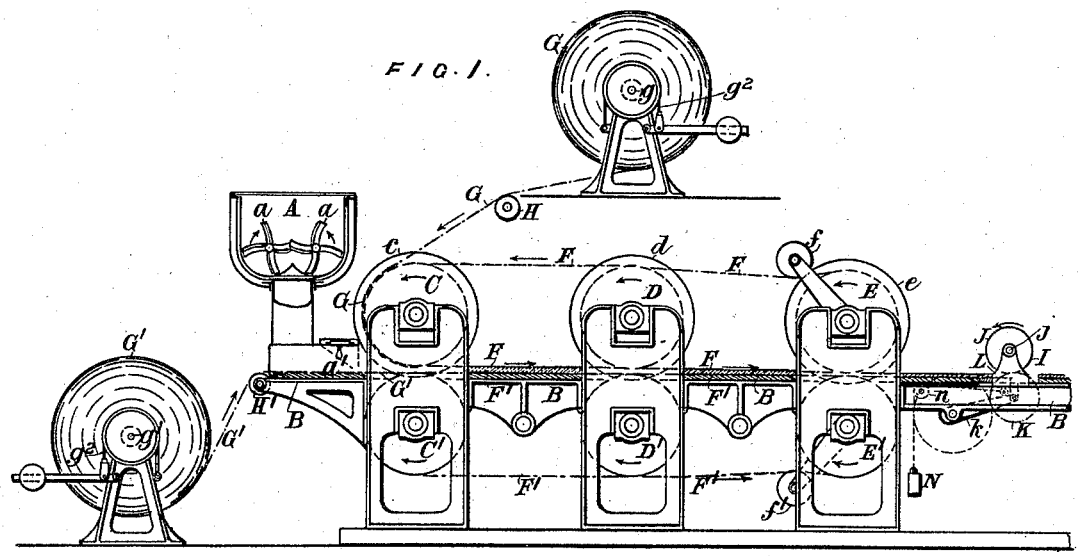
WITNESSES.
INVENTOR:
R. W. Hitchins
BY
ATTORNEYS (No Model.) 2 Sheets—Sheet 2.

R. W. HITCHINS.
MACHINERY FOR MAKING SLABS OF PLASTER, CEMENT, &c.

No. 582,060. Patented May 4, 1897.

WITNESSES.
Herbert A. Thorpe
J. W. Hanaford

INVENTOR:
R. W. Hitchins
BY
ATTORNEYS

THE NORRIS PETERS CO., PHOTO-LITHO., WASHINGTON, D. C.

UNITED STATES PATENT OFFICE.

RICHARD WILLIAM HITCHINS, OF LONDON, ENGLAND.

MACHINERY FOR MAKING SLABS OF PLASTER, CEMENT, &c.

SPECIFICATION forming part of Letters Patent No. 582,060, dated May 4, 1897.

Application filed January 13, 1896. Serial No. 575,324. (No model.) Patented in England January 18, 1895, No. 1,256; in France December 13, 1895, No. 252,449; in Belgium December 13, 1895, No. 118,833, and in Austria January 6, 1896, No. 46/36.

*To all whom it may concern:*

Be it known that I, RICHARD WILLIAM HITCHINS, plasterer, of 16 South Street, Finsbury, London, E. C., England, have invented new and useful Improved Machinery for the Production of Slabs of Plaster, Cement, or Composition, (which has been patented in Austria January 6, 1896, No. 46/36; in France December 13, 1895, No. 252,449; in Belgium December 13, 1895, No. 118,833, and in England January 18, 1895, No. 1,256,) of which the following is a full, clear, and exact description.

My invention relates to a machine for producing slabs of plaster, cement, or composition (for making ceilings or facing walls) by compressing the plastic material into the form of a continuous uniform layer between endless traveling bands, a strengthening-web of fabric being attached upon either or both of the surfaces of the layer, if required, and the continuous layer being in either case cut into lengths as fast as it is produced.

The composition used will vary. For cheap work I may use plaster-of-paris with hair, cocoanut fiber, wood-dust, wood-pulp, straw, hay, paper, torn rags, or other binding medium, and for such work it might not be necessary to cover the slabs with strengthening material. For superior work I would cover one or both surfaces of the slabs with a continuous web of woven fabric, usually canvas, or for fireproof work wire netting or gauze, an incombustible substance, such as slag-wool, asbestos fiber, or the like, being used as the binding medium. For outdoor work I may use Portland or other cement with or without the canvas or wire-netting, and as a covering for damp walls I may employ as a basis for the slabs a mixture of oils, varnishes, or the like with suitable fibrous material.

The apparatus is illustrated in the accompanying drawings, forming part of this specification, wherein—

Figure 3:
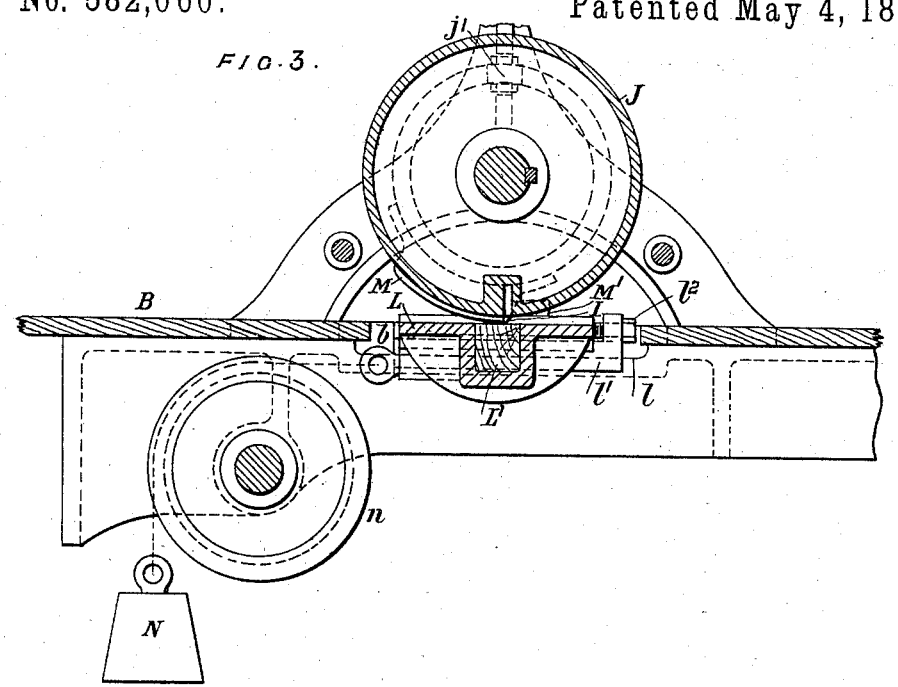
Figure 4:
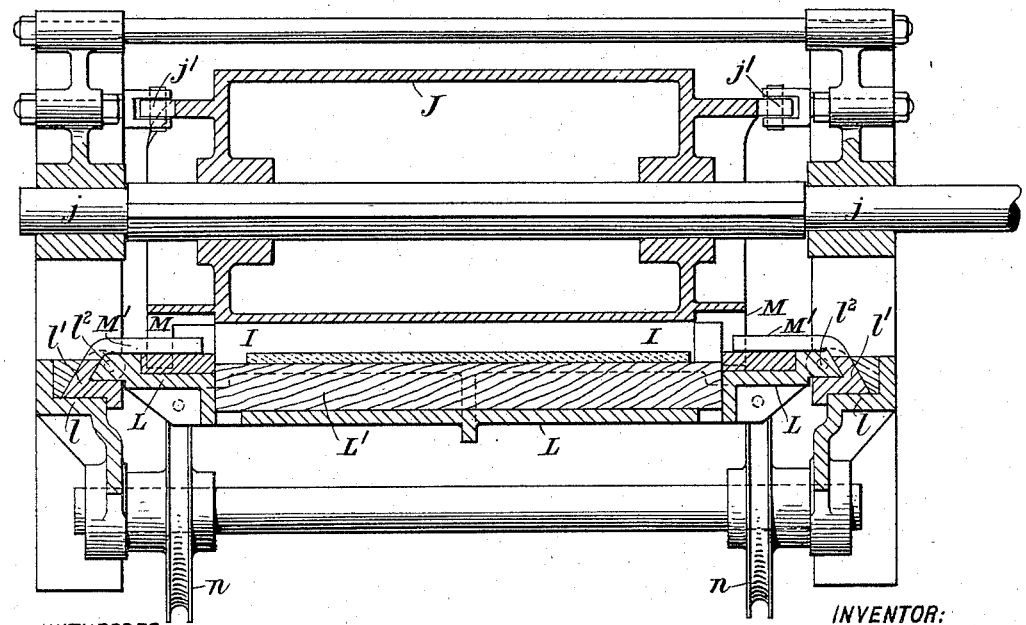

Figure 1 is a longitudinal side elevation, and Fig. 2 a plan, of my improved slab-making machine. Figs. 3 and 4 are enlarged detail views of cutting apparatus for dividing the sheet of plastic material into lengths.

The same letters of reference denote like parts in all the figures.

Referring to Figs. 1 and 2, A is a feed-hopper containing the plaster or other plastic material in admixture with fibrous binding material, the mass being plastic, although it may be brought to the proper consistency by the action of pug-mill arms $a$, working in the hopper and serving also to force the mass in a continuous and uniform stream through a narrow horizontal slit $a'$ above the table B of the machine. Means may be provided for regulating the orifice $a'$, which extends across the width of the table. The plastic material is thus delivered between a pair of horizontal rollers C C', extending completely across the table B and mounted the one above the other, the top of the lower roller C' being level with the upper surface of the table B, while the bottom of the upper roller C is maintained at a distance above equal to or rather greater than the required thickness of the slabs. The rollers C C' are continuously rotated in the same surface direction, so as to draw in between them the plastic material and roll it out into a layer of uniform thickness. The rollers C C' form the first of a series of pairs, whereof two other pairs D D' and E E' are shown in the drawings, all mounted and working similarly to the first pair C C', the table B being continued at the same surface level between the lower rollers C', D', and E'. The distance between the upper and lower rollers of successive pairs may be reduced, so as to gradually compress and consolidate the layer of plastic material during its passage.

All the rollers are geared together, as indicated in Fig. 2, so as to rotate at the same surface speed and in the proper directions, the carrying onward of the layer of plastic material being assisted by means of two endless traveling bands F F', of wire-gauze, strong canvas, or similar material of the same width as the layer and stretched the one over the upper series and the other over the lower series of rollers, so as to travel continuously. These bands may be kept tightly stretched by means of jockey-rollers $ff'$, Fig. 1, or by other means.

The upper rollers C, D, and E have flanges $c\ d\ e$ at both ends, these flanges being preferably knife-edged for the purpose of trimming the edges of the sheet of plastic material, but it might be preferable in some cases to affix the trimming-flanges to the lower instead of to the upper rollers.

Fig. 1 shows how the strengthening-web of woven fabric is applied. The rolls of fabric G G' are mounted upon axles $g\ g'$, the fabric from the rolls being led over guide-rollers H H' to the surfaces of the corresponding rollers C and C' and being carried by the bands F F' through the machine along with the layer of plastic material, with which it is united by the pressure of the rollers C C' D D' E E'. The carrying action of the bands F F' may, if necessary, be assisted by providing the bands F F' with projecting pins at the edges or elsewhere.

The cutting mechanism shown in Figs. 3 and 4 comprise a straight knife-blade I, mounted radially and longitudinally upon a roller J, carried in bearings $j$, above the table B, near the delivery end of the machine, so that the knife-blade I will cut completely across the sheet of material during the passage of the latter beneath the roller J. The roller J is continuously rotated by gearing from the adjacent roller E', the speed of its rotation, and consequently the length of the slabs produced, being determined by the diameter of a change-wheel K, interposed in the train of driving-wheels, this wheel K being carried in a bearing mounted on an adjustable arm K in the manner usual in change-gear.

In order that the knife I shall make a "drawing" cut, which is necessary to sever the woven fabric covering the sheet of plastic material, the ends of the roller J have cam-surfaces which bear against friction-rollers $j'$, mounted on the framework at each end of the roller, whereby the longitudinal motion of the roller J in its bearings necessary to produce a drawing cut of the knife is obtained.

In order to cut completely through the plastic sheet, the knife-edge beds into a cutter-block L', fitted in a frame L, working to and fro in a gap in the table B and so actuated as to receive sliding motion in the longitudinal direction of the machine-frame, so as to accompany the forward motion of the knife when the latter becomes embedded in it. For this purpose the frame L works in guides $l$, and a striker M on the end of the roller J engages a tooth M' on the frame L at the moment when or soon after the knife enters the material, and when the knife is again free from the cutter-block the frame L is returned to its initial position by the action of a spring or of a weight N, suspended by a cord passing over a guide-pulley $n$. In order to prevent the frame L jamming in its guides, the means by which it is moved are duplicated at the two sides of the machine.

To admit of the wooden cutter-block L' being shifted to present a new part of its surface when worn by the knife, the frame L is adjustable in shoes $l'$ by means of screws $l^2$, and it is the shoes $l'$ which work in the guides $l$ and to which the tooth M' is affixed, the shoes $l'$ also forming the stops to limit the backward movement.

In place of the cutting mechanism above described a guillotine-knife may be employed for the purpose of dividing the sheet of plastic material into slabs.

Fixed or rotary brushes may be suitably applied to act on the surfaces of the endless traveling bands F F' to free them from any particles of the plastic material.

I claim—

1. A machine, of the character described, comprising a supporting-table; pairs of pressing-rollers mounted in the table; endless bands running on said rollers and between which the plastic material passes; a hopper at one end of the table; rotary arms mounted in the hopper and serving to stir the plastic material and feed it to the said bands, and a rotary cutter at the rear end of the table for cutting the plastic material into lengths, substantially as described.

2. A machine, of the character described, comprising a table; pairs of pressing-rollers mounted in the table; one of each pair of rollers being provided with end flanges having knife-edges; endless bands running on the rollers, and between which the plastic material passes; a hopper at the front end of the table, rotary arms mounted in the hopper and serving to stir the plastic material and force it between the said bands, and a rotary cutter at the rear end of the table, substantially as described.

3. A machine, of the character described, comprising rollers arranged in pairs, one of each pair of rollers being provided with end flanges having knife-edges; endless bands carried by said rollers and between which the plastic material passes; a feeding device for feeding the plastic material in a continuous and uniform stream to the said bands; a rotary cutter having endwise movement; and a cutter-block below the cutter having sliding movement longitudinally of the machine, substantially as described.

4. A machine, of the character described, comprising a table; pressing-rollers mounted in pairs in the table, one of each pair of rollers being provided with end flanges having knife-edges; endless bands running on the rollers; a hopper at the front end of the table; rotary arms mounted in the hopper and serving to stir and force the material from the hopper; rollers supported adjacent to the pressing-rollers and each adapted to carry fabric which is fed between the endless bands on opposite sides of the plastic material, and a rotary cutter at the rear end of the table, substantially as described.

5. In a machine of the character described, the combination of a rotary cutter having endwise movement and provided with a striker at one end; means for imparting endwise movement to the cutter, and a movable frame below the cutter, said frame carrying a wooden block and provided with a tooth adapted to be engaged by the striker of the cutter, substantially as described.

RICHARD WILLIAM HITCHINS.

Witnesses:
T. W. KENNARD,
C. G. CLARK.